United States Patent
Takahashi et al.

(10) Patent No.: US 8,235,661 B2
(45) Date of Patent: Aug. 7, 2012

(54) TURBINE BLADE

(75) Inventors: Akira Takahashi, Kawasaki (JP); Mizuho Aotsuka, Tokyo (JP); Hiroshi Hamazaki, Iruma (JP); Haruyuki Tanimitsu, Tokyo (JP)

(73) Assignee: IHI Corporation (JP)

( * ) Notice: Subject to any disclaimer, the term of this patent is extended or adjusted under 35 U.S.C. 154(b) by 607 days.

(21) Appl. No.: 12/520,562

(22) PCT Filed: Dec. 19, 2007

(86) PCT No.: PCT/JP2007/074414
§ 371 (c)(1), (2), (4) Date: Aug. 13, 2009

(87) PCT Pub. No.: WO2008/075716
PCT Pub. Date: Jun. 26, 2008

(65) Prior Publication Data
US 2010/0014983 A1    Jan. 21, 2010

(30) Foreign Application Priority Data
Dec. 21, 2006  (JP) .................................. 2006-343951

(51) Int. Cl.
*F01D 5/14* (2006.01)

(52) U.S. Cl. ............. 416/39; 415/12; 415/914; 416/235

(58) Field of Classification Search .................... 415/12, 415/47, 48, 49, 50, 914; 416/23, 39, 228, 416/235, 236 R, 237, 241 R
See application file for complete search history.

(56) References Cited

U.S. PATENT DOCUMENTS

| | | | | |
|---|---|---|---|---|
| 4,778,339 A | * | 10/1988 | Usui et al. | 416/39 |
| 4,822,249 A | * | 4/1989 | Eckardt et al. | 416/235 |
| 4,969,799 A | * | 11/1990 | Usui et al. | 416/39 |
| 6,416,289 B1 | * | 7/2002 | Ramesh et al. | 416/235 |
| 7,207,772 B2 | * | 4/2007 | Johann | 415/181 |
| 7,878,759 B2 | * | 2/2011 | Mills et al. | 416/1 |
| 2003/0035968 A1 | | 2/2003 | Anderson et al. | 428/469 |

FOREIGN PATENT DOCUMENTS

| | | |
|---|---|---|
| JP | 60-36701 | 2/1985 |
| JP | 7-35702 | 7/1995 |

OTHER PUBLICATIONS

International Search Report mailed Feb. 5, 2008 in corresponding PCT International Application No. PCT/JP2007/074414.

* cited by examiner

*Primary Examiner* — Edward Look
*Assistant Examiner* — Ryan Ellis
(74) *Attorney, Agent, or Firm* — Ostrolenk Faber LLP

(57) ABSTRACT

The present invention provides a turbine blade that is exposed to a high temperature atmosphere at relatively high temperatures and to a low temperature atmosphere at relatively low temperatures, including: a concave-curve-like pressure surface that is concaved along a flow direction of fluid; a convex-curve-like suction surface that is convexed along the flow direction of the fluid; and a concave and convex formation device which causes a concave and convex portion along the flow of the fluid to appear on the suction surface when the turbine blade is exposed to the low temperature atmosphere, and which turns the suction surface into a smooth surface along a convex curve surface of the suction surface when the turbine blade is exposed to the high temperature atmosphere. With this construction, it is possible to reduce a pressure loss of the turbine blade at high Reynolds numbers in the low temperature atmosphere without increasing a pressure loss of the turbine blade at low Reynolds numbers in the high temperature atmosphere.

4 Claims, 3 Drawing Sheets

TURBINE BLADE

CROSS-REFERENCE TO RELATED APPLICATIONS

The present application is a 35 U.S.C. §§371 national phase conversion of PCT/JP2007/074414, filed Dec. 19, 2007, which claims priority of Japanese Patent Application No. 2006-343951, filed Dec. 21, 2006, the contents of which are incorporated herein by reference. The PCT International Application was published in the Japanese language.

BACKGROUND OF THE INVENTION

1. Field of the Invention

The present invention relates to a turbine blade that is exposed to a relatively high temperature atmosphere and a relatively low temperature atmosphere, for example, a turbine blade for use in a gas turbine and the like.

2. Background Art

Turbine blades for use in a gas turbine and the like, for example, include: a concave-curve-like pressure surface that is concaved along a flow direction of fluid; and a convex-curve-like suction surface that is convexed along the flow direction of the fluid. In such turbine blades, a phenomenon in which a laminar boundary layer of fluid formed on the suction surface is separated, that is, a laminar separation is conventionally known to occur. The laminar separation leads to noise or a decrease in the turbine efficiency. Therefore, in the example in Patent Document 1, there is proposed a technique of providing projections on the suction surface to positively form turbulence with which an occurrence of a laminar separation is suppressed.

Patent Document 1: Japanese Unexamined Utility Model Publication, First Publication No. H07-35702

For example, in a turbine in a jet engine of an aircraft, turbine blades are exposed to different temperature environments between when the aircraft is cruising and when it is taking off and landing. For example, when the aircraft is cruising, the turbine blades are exposed to a relatively low temperature environment (low temperature atmosphere) because the combustion energy of the combustion chamber provided at the previous stage of the turbine is low, that is, an engine output is low. On the other hand, when the aircraft is taking off and landing, the turbine blades are exposed to a comparatively high temperature environment (high temperature atmosphere) because the combustion energy of the combustion chamber is high, that is, an engine output is high.

In the turbine blades that are exposed to a low temperature environment in cruising and to a high temperature atmosphere in taking off and landing, there arises a phenomenon in which a laminar separation occurs in the low temperature atmosphere in cruising, while a laminar separation does not occur in the high temperature atmosphere in taking off and landing. This phenomenon is conceivably due to the fact that in a low temperature atmosphere in cruising, a laminar separation is likely to occur because of low Reynolds numbers while in a high temperature atmosphere in taking off and landing, a laminar separation is not likely to occur because of high Reynolds numbers.

Therefore, in the case where projections are provided on the suction surface as in Patent Document 1, a pressure loss of the turbine blade increases more than in the case without the projections, in a state of being exposed to the high temperature atmosphere in taking off and landing, that is, in a state where a laminar separation has not occurred. Consequently, there is a possibility of a decrease in turbine efficiency in spite of expectations.

SUMMARY OF THE INVENTION

The present invention has been achieved in view of the above problem, and has an object to decrease a pressure loss of a turbine blade at low Reynolds numbers in a low temperature atmosphere without increasing a pressure loss of the turbine blade at high Reynolds numbers in a high temperature atmosphere.

To achieve the above object, the present invention provides a turbine blade that is exposed to a high temperature atmosphere at relatively high temperatures and to a low temperature atmosphere at relatively low temperatures, including: a concave-curve-like pressure surface that is concaved along a flow direction of fluid; a convex-curve-like suction surface that is convexed along the flow direction of the fluid; and a concave and convex formation device which causes a concave and convex portion along the flow of the fluid to appear on the suction surface when the turbine blade is exposed to the low temperature atmosphere, and which turns the suction surface into a smooth surface along a convex curve surface of the suction surface when the turbine blade is exposed to the high temperature atmosphere.

According to the present invention, the concave and convex formation device causes the concave and convex portion along the flow of the fluid to appear on the suction surface when the turbine blade is exposed to the low temperature atmosphere, and turns the suction surface into a smooth surface along the convex curve surface when the turbine blade is exposed to the high temperature atmosphere. That is, when the turbine blade is exposed to the low temperature atmosphere, the concave and convex portion for suppressing the occurrence of a laminar separation is formed on the suction surface. When the turbine blade is exposed to the high temperature atmosphere, the concave and convex portion disappears from the suction surface.

Furthermore, in the present invention, the concave and convex formation device may be constituted by a metal material group made of a plurality of metal materials with different thermal expansion coefficients, the metal materials being arranged in the flow direction of the fluid.

Furthermore, in the present invention, the metal material group may be made of a plurality of metal materials with a relatively low expansion coefficient and a plurality of metal materials with a relatively high expansion coefficient alternately arranged in the flow direction.

According to the present invention, when the turbine blade is exposed to a low temperature atmosphere, the concave and convex portion for suppressing the occurrence of a laminar separation is formed on the suction surface. When the turbine blade is exposed to a high temperature atmosphere, the concave and convex portion disappears from the suction surface. That is, when Reynolds numbers are low and a laminar separation has occurred, the concave and convex portion appears. When Reynolds numbers are high and a laminar separation has not occurred, the concave and convex portion disappears.

Therefore, it is possible to reduce a pressure loss of the turbine blade at low Reynolds numbers in the low temperature atmosphere without increasing a pressure loss of the turbine blade at high Reynolds numbers in the high temperature atmosphere.

Figure 1:
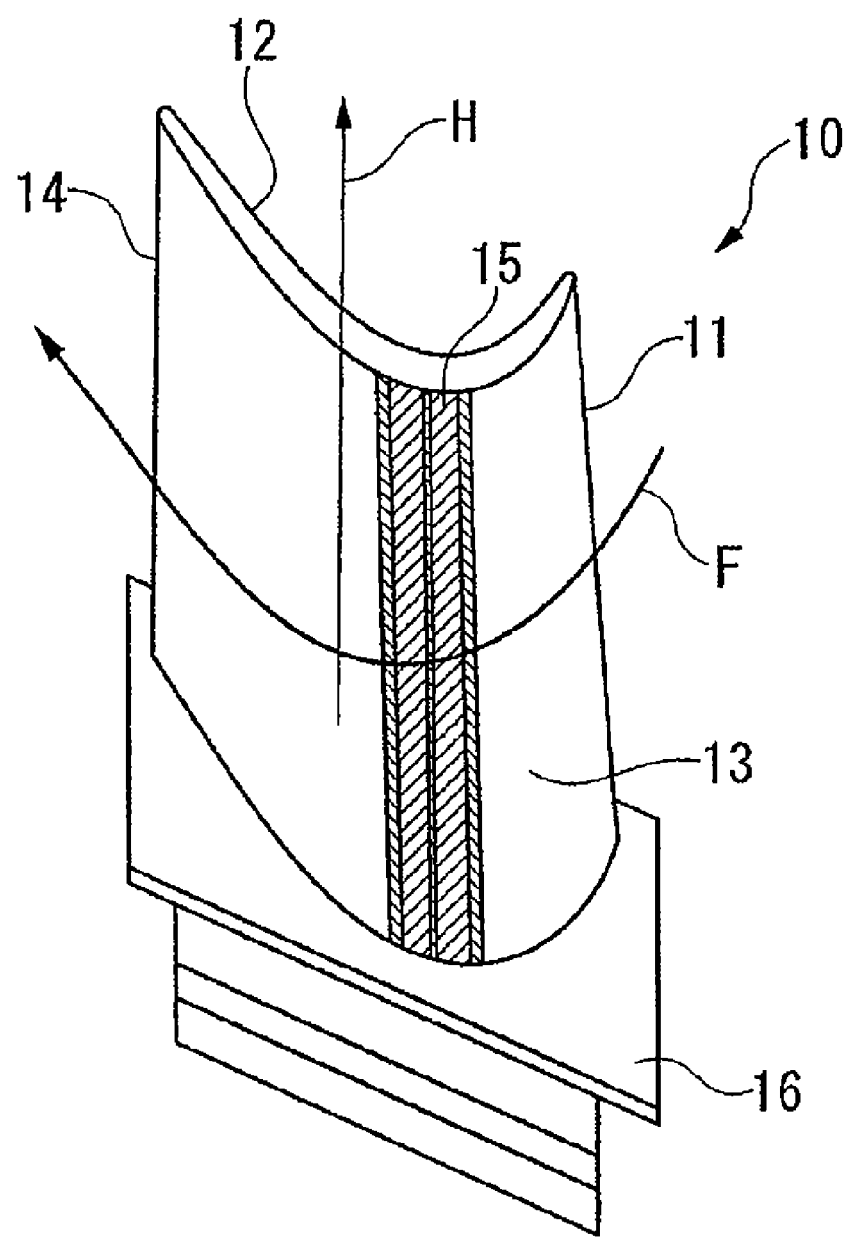
FIG. 1 is a perspective view showing a blade according to a first embodiment of the present invention.

DESCRIPTION OF THE REFERENCE NUMERALS 10, 30: turbine blade, 13: suction surface, 15: concave and convex formation portion (concave and convex formation device), 151: low expansion coefficient coating material (metal material), 152: high expansion coefficient coating material, 153: concave and convex portion, F: fluid

DESCRIPTION OF THE PREFERRED EMBODIMENTS

Hereinafter is a description of an embodiment of a turbine blade according to the present invention with reference to the drawings. In the following drawings, a scale of every member is appropriately modified in order to show the member in a recognizable size.

First Embodiment

FIG. 1 is a perspective view of a turbine blade 10 according to a first embodiment of the present invention. As shown in the figure, the turbine blade 10 has a construction surrounded by: a leading edge 11 on a side to which fluid F flows in; a concave-curve-like pressure surface 12 that is concaved along a flow direction of the fluid F; a convex-curve-like suction surface 13 that is convexed along the flow direction of the fluid F; and a trailing edge 14 on a side from which the fluid F flows out. In the present embodiment, an attaching mount 16 for attachment onto a turbine main unit (not shown in the figure) is provided on a side surface of the turbine blade 10.

On the suction surface 13, a concave and convex formation portion 15 (concave and convex formation device) is provided over the entire region along a width direction H of the turbine blade 10 (a direction orthogonal to a chord of the blade).

Figure 2:
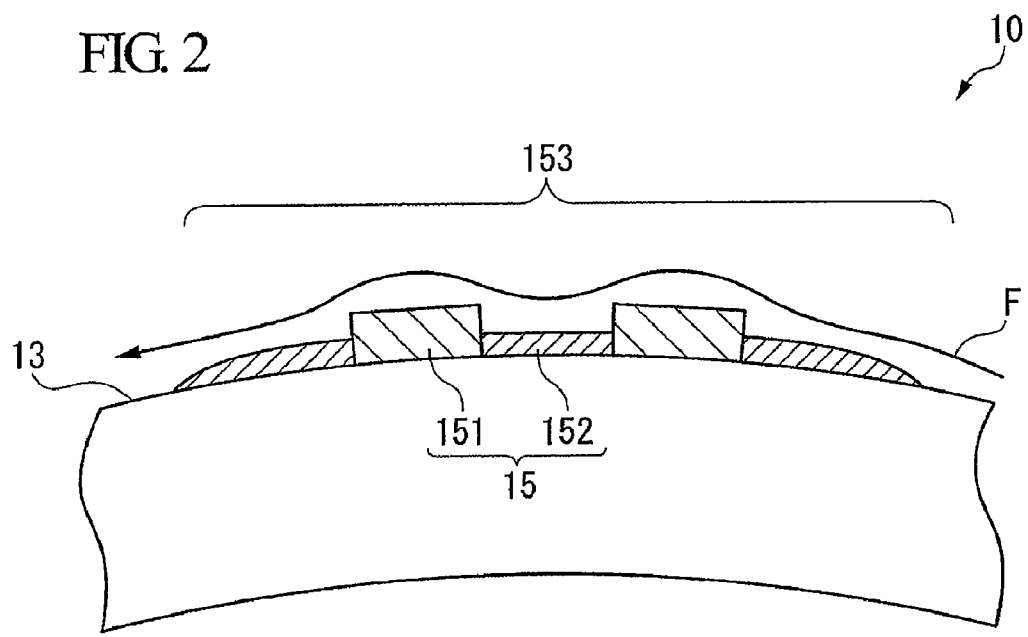
FIG. 2 is a cross-sectional view of a main part of the blade according to the first embodiment of the present invention, including the vicinity of a concave and convex formation portion provided therein, and shows a case where the blade is exposed to a low temperature atmosphere.

FIG. 2 is a cross-sectional view of a main part of the turbine blade 10 including the vicinity of the concave and convex formation portion 15. As shown in the figure, the concave and convex formation portion 15 is made of a plurality of low expansion coefficient coating materials 151 and a plurality of high expansion coefficient coating materials 152 (two rows of low expansion coefficient coating materials 151 and three rows of high expansion coefficient coating materials 152, in the present embodiment) alternately arranged in the flow direction of the fluid F.

The low expansion coefficient coating material 151 is formed from an alloy material (a metal material) with a thermal expansion coefficient less than that of the high expansion coefficient coating material 152. For the low expansion coefficient coating material 151, for example an alloy material including a platinum or zirconium alloy or the like can be used. Furthermore, the high expansion coefficient coating material 152 is formed from an alloy material (metal material) with a thermal expansion coefficient greater than that of the low expansion coefficient coating material 151. For the high expansion coefficient coating material 152, for example, an alloy material including an aluminum alloy or the like can be used. That is, in the present embodiment, the concave and convex formation portion 15 is constituted by a metal material group made of a plurality of metal materials with different thermal expansion coefficients, the metal materials being arranged in the flow direction of the fluid F.

Figure 3:
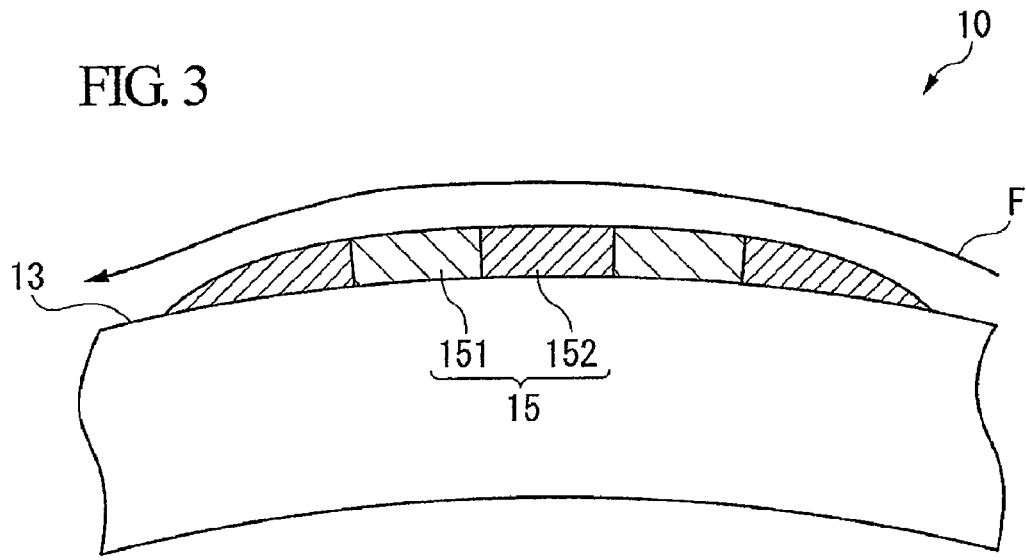
FIG. 3 is a cross-sectional view of the main part of the blade according to the first embodiment of the present invention, including the vicinity of the concave and convex formation portion provided therein, and shows a case where the blade is exposed to a high temperature atmosphere.

In such a concave and convex formation portion 15, the thickness and thermal expansion coefficient of the low expansion coefficient coating material 151 and the thickness and thermal expansion coefficient of the high expansion coefficient coating material 152 are set so that when the turbine blade 10 is exposed to a low temperature atmosphere, the concave and convex portion 153 along the flow of the fluid F appears on the suction surface 13 as shown in FIG. 2, and also so that when the turbine blade 10 is exposed to a high temperature atmosphere, the suction surface 13 is turned into a smooth surface that is convexed along the flow direction of the fluid F (a smooth surface along a convex curve surface) as shown in FIG. 3.

That is, the turbine blade 10 of the present embodiment is provided with the concave and convex formation portion 15 which causes the concave and convex portion 153 along the flow of the fluid F on the suction surface 13 when the turbine blade 10 is exposed to a low temperature atmosphere, and which turns the suction surface 13 into a smooth surface along the convex curve surface that convexes along the flow direction of the fluid F when the turbine blade 10 is exposed to a high temperature atmosphere.

In the present embodiment, "high temperature atmosphere" signifies temperatures to which when the turbine with the turbine blades 10 is installed in a jet engine of an aircraft, the turbine blades 10 are exposed in a state of high combustion energy of the combustion chamber in taking off and landing of the aircraft, that is, in a state of a high engine output. It is an atmosphere in which no laminar separation occurs irrespective of the presence or absence of the concave and convex portion 153 (an atmosphere at high Reynolds numbers). On the other hand, in the present invention, "low temperature atmosphere" signifies temperatures to which the turbine blades 10 are exposed in a state of low combustion energy of the combustion chamber in cruising of the aircraft, that is, in a state of a low engine output. It is an atmosphere in which a laminar separation occurs in the absence of the concave and convex portion 153 (an atmosphere at low Reynolds numbers). For example, when the difference in temperature between the high temperature atmosphere and the low temperature atmosphere is approximately 300° C., the difference in thickness between the low expansion coefficient coating material 151 and the high expansion coefficient coating material 152 is approximately 0.05 mm in the case of the low temperature atmosphere.

When the turbine blade 10 of the present embodiment as constructed in this manner is exposed to the low temperature atmosphere, the concave and convex portion 153 appears on the suction surface 13 as shown in FIG. 2. The flow of the fluid F that has flowed from the leading edge 11 side of the turbine blade 10 onto the suction surface hits the concave and convex portion 153, to thereby form turbulence. With such turbulence, the fluid F flows out from the trailing edge 12 of the turbine blade 10 while suppressing the generation of the laminar separation in which the laminar boundary layer of the fluid F is separated from the suction surface 13. Therefore, it is possible to reduce a pressure loss of the turbine blade 10 more than in the case where the laminar layer of the fluid F is separated from the suction surface 13.

Furthermore, when the turbine blade 10 is exposed to the high temperature atmosphere, the suction surface 13 is turned into a smooth surface as shown in FIG. 3. The flow of the fluid F that has flowed from the leading edge 11 side of the turbine blade 10 onto the suction surface flows out from the trailing edge 12 of the turbine blade 10 without obstruction. In this manner, the concave and convex portion 153 disappears from the suction surface 13 in a state where no laminar separation has occurred, to thereby make it possible to reduce a pressure loss of the turbine blade 10 more than in the case where the concave and convex portion 153 is present.

When such a turbine blade 10 according to the present embodiment is exposed to the low temperature atmosphere, the concave and convex portion 153 for suppressing the occurrence of a laminar separation is formed on the suction surface 13. When the turbine blade 10 is exposed to the high temperature atmosphere, the concave and convex portion 153 disappears from the suction surface 13. That is, when Reynolds numbers are low and a laminar separation has occurred, the concave and convex portion 153 appears. When Reynolds numbers are high and a laminar separation has not occurred, the concave and convex portion 153 disappears.

Therefore, it is possible to reduce a pressure loss of the turbine blade 10 in the low temperature atmosphere without increasing a pressure loss of the turbine blade 10 in the high temperature atmosphere.

It is preferable that the formation position of the concave and convex formation portion 15 be closer to the leading edge 11 than a maximum velocity point at which the flow velocity of the fluid F having flowed onto the suction surface 13 becomes maximum on the suction surface 13.

With the concave and convex formation portion 15 thus being positioned closer to the leading edge 11 than a maximum velocity point at which the flow velocity of the fluid F becomes maximum on the suction surface 13, the turbulence that is produced by the fluid F hitting the concave and convex portion 153 is made strong in the case where the concave and convex portion 153 has appeared. Thereby, it is possible to further suppress the occurrence of a laminar separation.

Second Embodiment

Next is a description of a second embodiment of the present invention. In the description of the second embodiment, like constituent elements to those of the above first embodiment are explained in a simplified manner or are not repetitiously explained.

Figure 4:
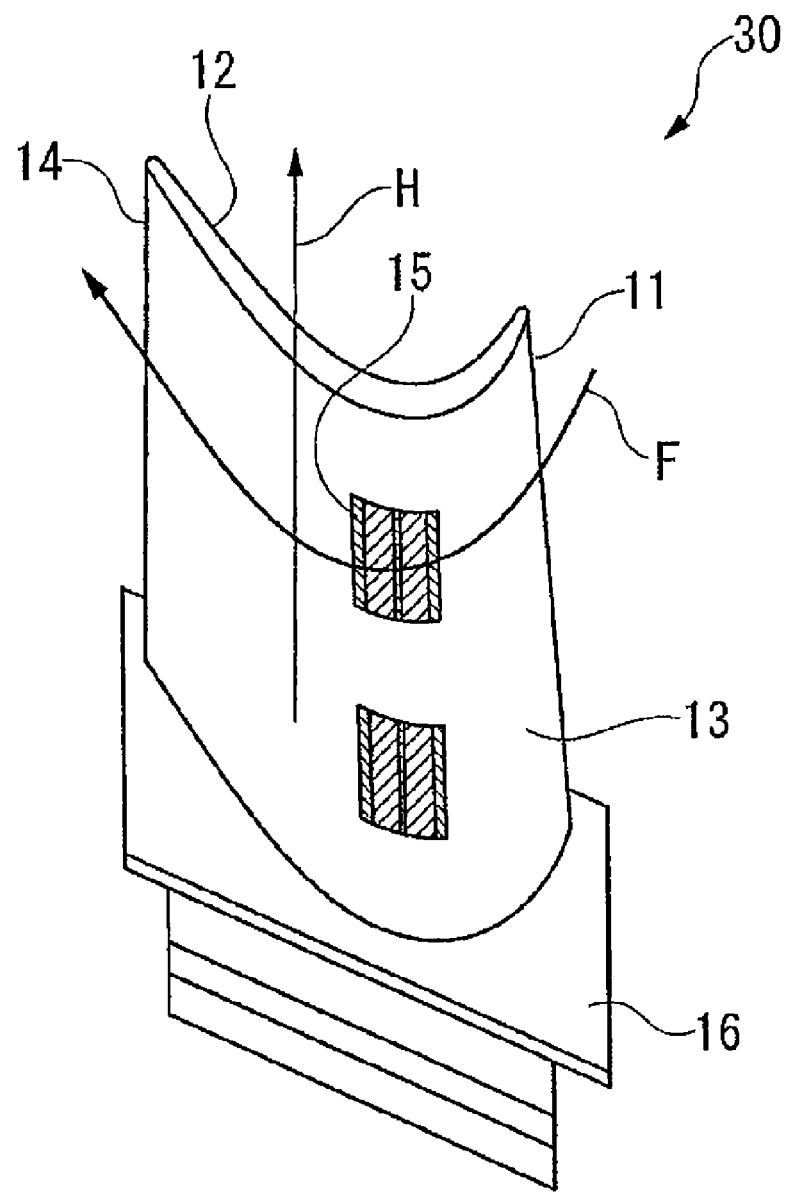
FIG. 4 is a perspective view showing a blade according to a second embodiment of the present invention.

FIG. 4 is a perspective view showing a turbine blade 30 of the second embodiment. As shown in the figure, in the turbine blade 30 of the present embodiment, the concave and convex formation portion 15, which is provided over the entire region along the width direction H of the turbine blade 10 (the direction orthogonal to a chord of the blade) in the above first embodiment, is intermittently provided in the width direction H of the turbine blade 30.

In the turbine blade 30 of the present embodiment with such construction, a formation material of the concave and convex formation portion 15, that is, the low expansion coefficient coating materials 151 and the high expansion coefficient coating materials 152 can be reduced in amount. Therefore, it is possible to decrease a pressure loss of the blade in the low temperature atmosphere at lower costs, without increasing a pressure loss of the blade in the high temperature atmosphere.

While preferred embodiments of the blade according to the invention have been described with reference to the drawings, the invention is obviously not limited to the above embodiments. Shapes, combinations and the like of the constituent members illustrated in the above embodiments are merely examples, and various modifications based on design requirements and the like can be made without departing from the spirit or scope of the invention.

For example, in the above embodiments, the description refers to the construction in which the concave and convex formation portion 15 is made of two types of coating materials (the low expansion coefficient coating material 151 and high expansion coefficient coating material 152). However, the present invention is not limited to this. For example, two types of bar-like members may be formed from the same metal materials as those of the low expansion coefficient coating materials 151 and the high expansion coefficient coating materials 152, and these expansive members may be partly buried and alternately arranged to construct the concave and convex formation portion 15.

Furthermore, in the above embodiments, the description refers to the construction in which the concave and convex formation portion 15 is made of the plurality of low expansion coefficient coating materials 151 and the plurality of high expansion coefficient coating materials 152 alternately arranged. However, the present invention is not limited to this. The concave and convex formation portion 15 may be made of a row of low expansion coefficient coating material 151 and a row of high expansion coefficient coating material 152. In addition, the concave and convex formation portion 15 may be made of a larger number of low expansion coefficient coating materials 151 and a larger number of high expansion coefficient coating materials 152 alternately arranged.

In such a case, it is possible to suppress a laminar separation in the low temperature atmosphere even if a height difference is small between the low expansion coefficient coating material 151 and the plurality of high expansion coefficient coating materials 152.

Furthermore, in the above embodiments, the description refers to the construction in which the concave and convex formation portion 15 is made of two types of coating materials (the low expansion coefficient coating material 151 and the high expansion coefficient coating material 152). However, the present invention is not limited to this. The concave and convex formation portion 15 may be constructed by arranging more types of coating materials. In such a case, it follows that the coating materials have different thermal expansion coefficients. Therefore, it is possible to bring about a finer change in form in the concave and convex formation portion 15.

Furthermore, the concave and convex formation device of the present invention is not limited in construction to the concave and convex formation portion 15 of the above embodiments. Any construction may be used so long as, according to a difference in temperature between the high temperature atmosphere and the low temperature atmosphere, it causes the concave and convex portion 153 to disappear from the suction surface 13 in the case of the high temperature atmosphere, and also it forms the concave and convex portion 153 on the suction surface 13 in the case of the low temperature atmosphere. For example, a concave and convex formation device may include: a detection device for detecting a temperature to which the blade is exposed; a formation mechanism capable of causing the concave and convex portion 153 to appear on the suction surface 13; and a control portion for controlling the formation mechanism based on a detection result of the detection device.

INDUSTRIAL APPLICABILITY

As described above, according to the turbine blade installed in a jet engine of an aircraft according to the present invention, it is possible to decrease a pressure loss of a turbine blade at low Reynolds numbers in a low temperature atmosphere without increasing a pressure loss of the turbine blade at high Reynolds numbers in a high temperature atmosphere.

The invention claimed is:

1. A turbine blade that is exposed to a high temperature atmosphere at relatively high temperatures and to a low temperature atmosphere at relatively low temperatures, comprising:
 a concave-curve-like pressure surface that is concaved along a flow direction of fluid;
 a convex-curve-like suction surface that is convexed along the flow direction of the fluid; and
 a concave and convex formation device which causes a concave and convex portion along the flow of the fluid to appear on the suction surface when the turbine blade is exposed to the low temperature atmosphere, and which turns the suction surface into a smooth surface along a convex curve surface of the suction surface when the turbine blade is exposed to the high temperature atmosphere.

2. The turbine blade according to claim 1, wherein the concave and convex formation device is constituted by a metal material group made of a plurality of metal materials with different thermal expansion coefficients, the metal materials being arranged in the flow direction of the fluid.

3. The turbine blade according to claim 2, wherein the metal material group is made of a plurality of metal materials with a relatively low expansion coefficient and a plurality of metal materials with a relatively high expansion coefficient alternately arranged in the flow direction.

4. The turbine blade according to claim 1, wherein the metal material group is made of a plurality of metal materials with a relatively low expansion coefficient and a plurality of metal materials with a relatively high expansion coefficient alternately arranged in the flow direction.

* * * * *